United States Patent [19]

Elferink et al.

[11] Patent Number: 5,240,100
[45] Date of Patent: Aug. 31, 1993

[54] APPARATUS FOR RECEIVING OR TRANSFERRING, VERTICALLY TRANSPORTING AND DELIVERING ARTICLES SUCH AS EGGS

[75] Inventors: Hendrik Elferink; Johan H. Hesselink; Leonardus J. Temming, all of Aalten, Netherlands

[73] Assignee: FPS Food Processing Systems B.V., Barneveld, Netherlands

[21] Appl. No.: 879,376

[22] Filed: May 7, 1992

[30] Foreign Application Priority Data

May 7, 1991 [NL] Netherlands ................. 9100785

[51] Int. Cl.⁵ ............................................. B56G 47/30
[52] U.S. Cl. ................................. 198/418.6; 198/534
[58] Field of Search .............. 198/411, 416, 418.6, 198/432, 534

[56] References Cited

U.S. PATENT DOCUMENTS

| | | | |
|---|---|---|---|
| 2,908,375 | 10/1959 | Hoover et al. | 198/418.6 X |
| 3,311,216 | 3/1967 | Jones . | |
| 3,627,102 | 12/1971 | Talbot | 198/418.6 |
| 3,964,233 | 6/1976 | Thomas | 198/418.6 X |
| 3,973,667 | 8/1976 | Jellema et al. | 198/418.6 |
| 4,366,896 | 1/1983 | Tomosue . | |
| 4,454,942 | 6/1984 | Oizumi | 198/418.6 |
| 4,863,008 | 9/1989 | Doi | 198/418.6 X |

FOREIGN PATENT DOCUMENTS 655559 1/1938 Fed. Rep. of Germany .
2717638 10/1978 Fed. Rep. of Germany .
735675 8/1955 United Kingdom .

Primary Examiner—D. Glenn Dayoan
Attorney, Agent, or Firm—Griffin, Butler, Whisenhunt & Kurtossy

[57] ABSTRACT

An apparatus for receiving or transferring, vertically transporting and delivering articles such as eggs. The apparatus provides a feed conveyor (2) for presenting successive articles (5) in oriented position and an endless, continuously movable and substantially vertically arranged carrier conveyor (9) for receiving the articles successively presented by the feed conveyor. The carrier conveyor (9) is equipped for retaining and supporting the articles (5) during the vertical transport by way of a fixed guideway (11), extending in the direction of transport, over which the article (5) can move in sliding fashion and which supports the article on one side, as well as a support member (10) pivotally mounted on the carrier conveyor (9), which member supports the article (5) on the opposite side and keeps it pressed against the guideway (11).

9 Claims, 3 Drawing Sheets

APPARATUS FOR RECEIVING OR TRANSFERRING, VERTICALLY TRANSPORTING AND DELIVERING ARTICLES SUCH AS EGGS

BACKGROUND OF THE INVENTION

This invention relates to an apparatus for receiving or transferring, vertically transporting and delivering articles such as eggs, which apparatus comprises a feed conveyor for presenting successive articles in oriented position, an endless, continuously movable, substantially vertically arranged carrier conveyor for receiving the articles successively presented by the feed conveyor, this carrier conveyor being equipped with a series of means for retaining and supporting an article during the vertical transport.

Such an apparatus is disclosed in U.S. patent specification No. 3,342,012. This prior art apparatus comprises a rotatable mill located above the discharge end of a substantially horizontally arranged feed conveyor. This mill, in cooperation with a fixedly mounted guide plate, can transfer the successively supplied eggs to a carrier conveyor arranged in line therewith, which is equipped with a series of egg-receiving elements. Each egg-receiving element consists of two pivotally interconnected fork-shaped parts which can be moved relative to each other at the point of transfer, in such a manner that an article can be received between these parts, and the egg-receiving elements close upon further displacement along the transport track for further transporting the article in an oriented position. At a downstream point of the path traversed by the carrier conveyor, an opposite motion of the receiving elements takes place, so that the articles are discharged. This prior art apparatus exhibits the drawback that the two-part receiving elements, after an egg has been received between these parts, must be closed and subsequently opened at the point of discharge. The control of the egg-receiving element in the opening and closing direction constitutes an important limitation of the operating speed of the apparatus.

The object of the present invention is to provide an apparatus of the above-described type, in which this drawback has been obviated.

SUMMARY OF THE INVENTION

To that end, the apparatus according to the invention is characterized in that the means for retaining and supporting an article comprise a fixed guideway extending in the direction of transport, over which the article can move in sliding fashion and which supports the article on one side, as well as a support element pivotally mounted on the carrier conveyor, this support element supporting the article on the opposite side and keeping it pressed against the guideway.

By setting the pivotable support element in a suitable, oblique position relative to the guideway, a funnel is formed which moves along with the articles during the vertical transport thereof and keeps the articles which have been supplied in oriented position in a desired, oriented position during the vertical transport. Appropriate control of the support element in the supply and in the discharge position enables a simple controlled transfer and discharge behaviour of the apparatus.

It is observed that U.S. patent specification No. 4,366,896 discloses an apparatus for receiving or transferring, vertically transporting and delivering eggs, which apparatus also comprises a feed conveyor for the supply of successive oriented eggs, an endless, continuously movable and obliquely downwardly arranged carrier conveyor for receiving the eggs successively supplied by the feed conveyor, which carrier conveyor is equipped with means for retaining and supporting the eggs during the vertical transport. These retaining means are formed by chutes arranged slantwise at an angle of 25°-40° as well as crossbars arranged at a short distance above the sliding surface of these chutes, the end of the crossbars being connected with chains on opposite sides of the chutes, the chains together forming an endless carrier conveyor. During the downward transport, the eggs slide over the chutes and are supported at the bottom by the crossbars. These crossbars allow rotation of the downwardly sliding eggs. For that reason, above the chutes a resiliently suspended upper sliding plate which bears on the eggs must be arranged so as to prevent the eggs from losing their desired oriented position. On account of the slanting course of the carrier conveyor, provisions must be made for modifying the position of the eggs, such that the longitudinal axis thereof is approximately vertical, so as to enable discharge of the eggs into a conventional egg package.

In the apparatus according to the invention, the carrier conveyor can be arranged substantially vertically and the articles, in this case eggs, can be discharged directly and in a controlled fashion from the retaining and supporting means into a conventional egg package.

Preferably, the support element of the apparatus according to the invention is in the form of a flat strip. This allows the lateral shift of an article during the vertical transport.

In order to bring the support member in the proper position and to keep it therein in the course of the path it traverses, this support member is preferably equipped with control fingers which are arranged in circumferentially staggered relationship relative to the support member and can cooperate with a guide provided along the path of travel of the carrier conveyor. This guide provides that the support member is brought into and kept in the desired position during the transport of the article.

Adjacent the run-out end of the guideway, this guide is provided with two sloping projections, separated by an intermediate lower portion. This offers the possibility of discharging the article from the apparatus in a controlled manner and at a low speed.

To effect controlled transfer of the oriented egg supplied by the feed conveyor to the substantially vertically arranged carrier conveyor, this carrier conveyor is equipped with a transfer mill, whose axis of rotation coincides with that of the reverse gear of the carrier conveyor. The wings of the transfer mill can temporarily support the successively supplied articles during the transfer thereof.

The feed conveyor for supplying the articles is typically so designed that a plurality of juxtaposed articles are supplied in oriented position. In that case, the apparatus according to the invention comprises a series of juxtaposed guideways, each pivotally suspended, while means are present for setting the mutual lateral distance between the guideways. The mutual distance of the run-out end of the guideways can in this manner be adjusted, for instance to the dimensions of the egg package in which the eggs coming from the carrier conveyor are to be deposited.

One embodiment of the apparatus according to the invention will now be further elucidated, with reference to the accompanying drawings, in which:

DESCRIPTION OF THE PREFERRED EMBODIMENTS

Figure 1:
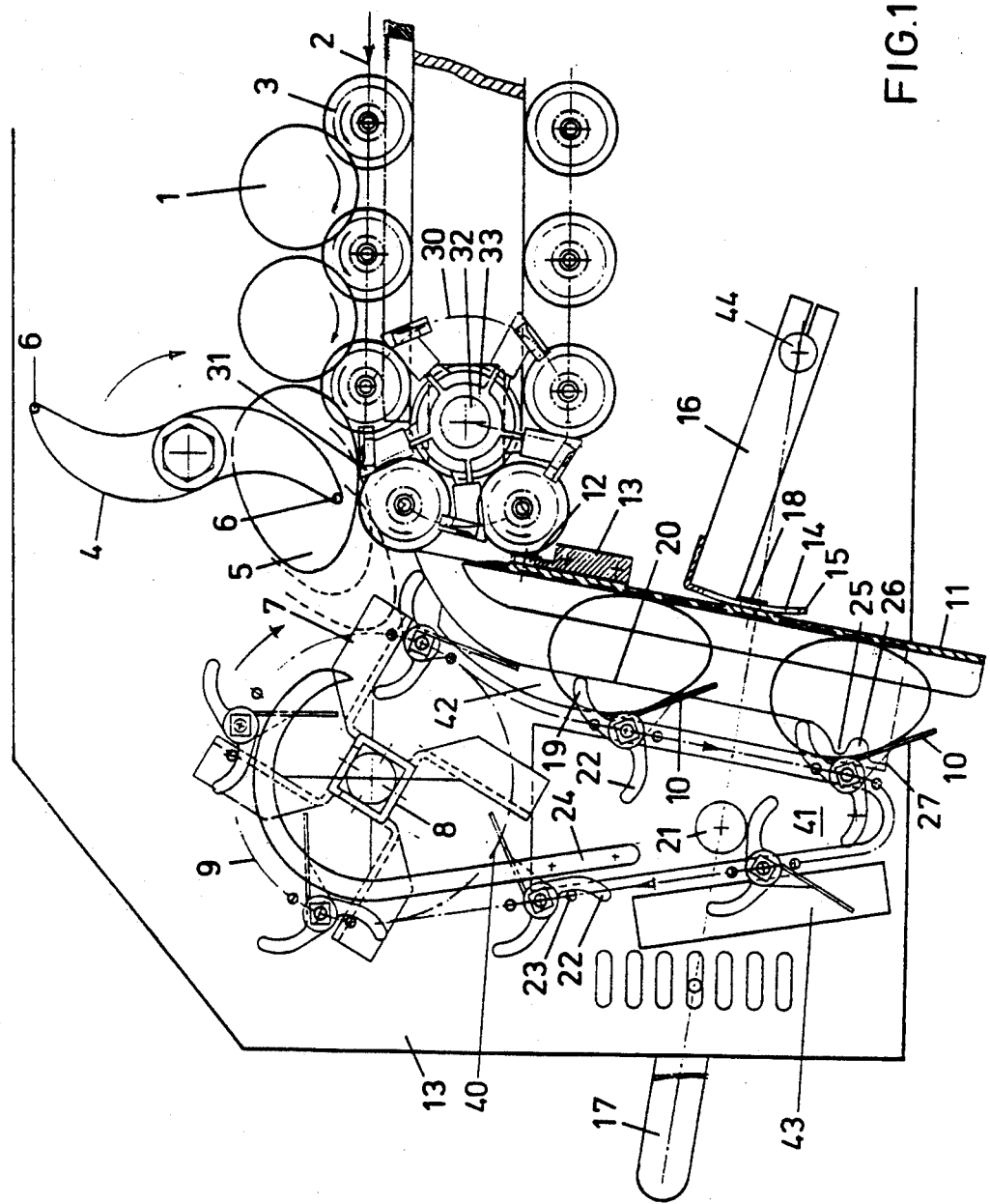
FIG. 1 is a partial side view of the apparatus according to the invention.
Figure 2:
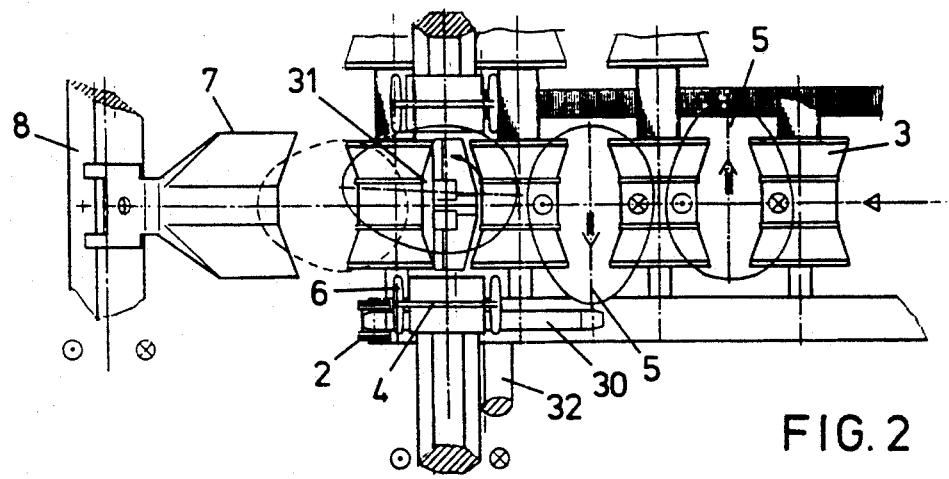
FIG. 2 is a top plan view of the feed conveyor of the apparatus as shown in FIG. 1.
Figure 3:
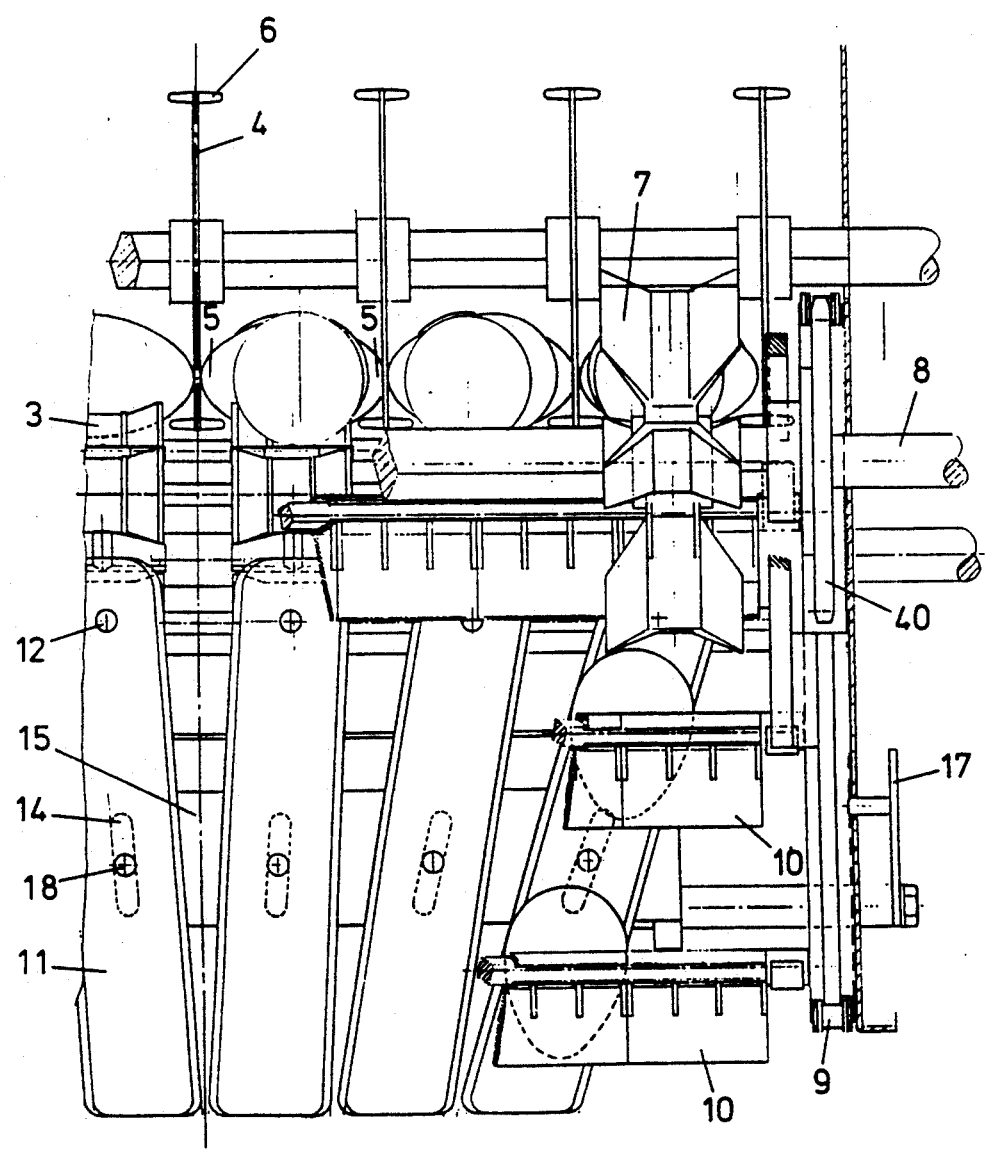
FIG. 3 is a front view of a part of the apparatus shown in FIGS. 1 and 2.
Figure 4A:
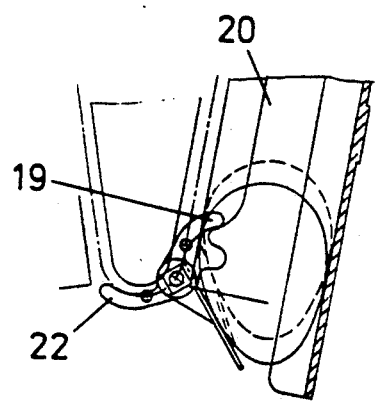
FIGS. 4A-C are schematic views of the run-out end of the apparatus according to the invention, showing the controlled discharge of an article, in this case an egg.
Figure 4B:
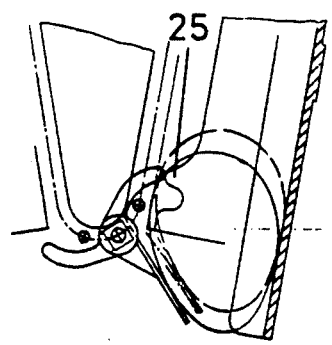
Figure 4C:
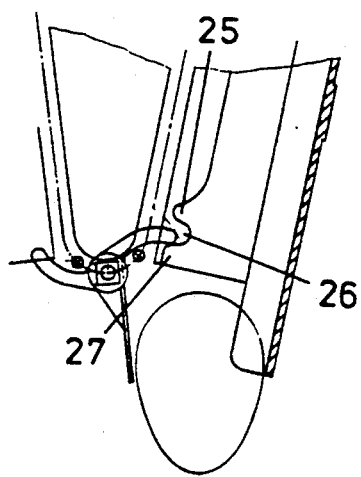

As shown in the drawing, the apparatus according to the invention comprises a feed conveyor 2 fitted with rotatably mounted rollers 3 on which articles 1, 5, in this case eggs, can be transported. Located adjacent the discharge end is a mill 4 with wings, which is arranged substantially vertically above the reverse gear 30 of the feed conveyor 2, mounted on a shaft 32. This mill 4 provides for the orientation of the eggs 5 into the transfer position. The construction of the feed conveyor 2 will not be further discussed herein because this construction is the subject of Dutch copending patent application no. 91.00786.

Arranged at the discharge end of the feed conveyor 2 is a chain carrier conveyor 9 consisting of two chains running in mutually parallel relationship, between which are arranged support members 10 which are pivotally mounted and can cooperate, over a part of the path to be traversed, with a guideway or guideways 11 arranged opposite the carrier conveyor.

The chains of carrier conveyor 9 are driven by reverse gears 40 and run in downward direction along the guides 41, 42 and in upward direction along the guides 41, 43.

The support members 10 are mounted on pins which are part of the chains of carrier conveyor 9 referred to. Each pin on which a support member 10 is mounted also has two control fingers 19, 22 affixed to it, by means of which the position of a support member 10 can be controlled during its movement along the path of travel.

At the point of transition where articles are transferred from the horizontal feed conveyor 2 to the substantially vertically extending carrier conveyor 9, a transfer mill with wings 7 is mounted on a shaft 8. By means of this, a controlled transmission of the articles, in this case eggs 5, from the feed conveyor 2 to the carrier conveyor 9 is obtained.

During the vertical transport of the articles, the eggs are supported on one side by the support members 10 which, by means of the control fingers 19, 22, are brought into the desired position while traversing the path of travel. The control fingers 19 cooperate with a fixed guide 20 and a stop 21, while the control fingers 22 cooperate with a fixed guide 24 and stop pins 23 mounted on the chain. On the side opposite the support member 10, the eggs are given sliding support by guideways 11. To enable the centre-to-centre distance to be modified or set on the underside of the guideways with a view to a proper adjustment thereof to the dimensions of an egg package, the guideways 11 are pivotally suspended in a frame 13. The means for pivoting the guideways 11 comprise a curved section 15 which rests against the backwall of the guideways 11. Via a lever 16 the curved section 15 is pivotally mounted on a shaft 44. The section 15 comprises a plurality of obliquely positioned slots 14, one for each guideway 11, in which slots 14 extend pins 18 mounted at the back of the guideway 11. Mounted on the shaft 44 is further an operating lever 17 by means of which the curved section 15 can be pivoted, whereby the guideways 11 can be moved closer to or further away from each other.

At the run-out end of guideways 11, two sloping projections 25, 27 are provided on the guide 20, these projections being separated by a lower portion 26 located therebetween. As the control finger 19 runs over the sloping projection 25, the associated support member 10 is swiveled in the direction of the guideway, so that the speed of the egg present on the support member 10 is reduced to substantially zero. Owing to the control finger 19 subsequently falling into the lower portion 26, a rapid discharge of the egg is obtained, while the subsequent sloping projection ensures that the support member 10, after the discharge of the egg in question, does not follow through, thereby abutting against an article already deposited in the receiving station, which could damage this article, in this case the egg.

What we claim is:

1. An apparatus for receiving or transferring, vertically transporting and delivering articles such as eggs, which apparatus comprises
   a feed conveyor (2) for presenting successive articles (5) in an oriented position,
   an endless, continuously movable and substantially vertically arranged carrier conveyor (9) for receiving the articles successively presented by the feed conveyor, said carrier conveyor (9) having a series of means (10, 11) for successively retaining and supporting each article (5) during vertical transport thereof,
characterized in that
   the means (10, 11) for retaining and supporting each article (5) comprises a fixed guideway (11) extending in the direction of transport, over which the article (5) can move in sliding fashion and which supports the article on one side thereof, and a support member (10) pivotally mounted on the carrier conveyor (9), said support element supporting the article (5) on the opposite side and keeping it pressed against the guide (11).

2. An apparatus according to claim 1, characterized in that the support member (10) is in the form of a flat strip, which allows a lateral shift of an article (5) during the vertical transport thereof.

3. An apparatus according to claim 1, characterized in that each support element (10) is equipped with control fingers (19, 22) which are arranged in circumferentially staggered relationship relative to the support member (10) and a guide (20) arranged along a path of travel of the carrier conveyor (9) and cooperating with the control fingers for bringing and keeping the support member (10) in a preselected position during the transport of the article (5) over the guideway (11).

4. An apparatus according to claim 2, characterized in that along a path of travel of the carrier conveyor (9), a stop (21) and a fixed guide (24) relocated opposite guideway (11) and arranged in a path of travel of the control finger (19, 22) for bringing the support 91) into a preselected position at a run-in end of the guideway (11).

5. An apparatus according to claim 3, characterized in that a stop pin (23) is mounted on the carrier conveyor (9) and a pivot pin on each support member (10) is adjacent the stop pin for arresting one of the control fingers (22) over a portion of the path of travel of the carrier conveyor (9).

6. An apparatus according to claim 3, characterized in that a portion of the guide (20) is adjacent to a run-out end of the guideway (11) and has at least one sloping projection (25).

7. An apparatus according to claim 1, characterized in that the carrier conveyor (9) has a transfer mill, wings (7) and a reverse gear (40), and an axis of rotation of the transfer mill coincides with an axis of rotation of the reverse gear (40) of the carrier conveyor (9) and the wings (7) temporarily support the successively supplied articles (5).

8. An apparatus according to claim 1, characterized in that the apparatus comprises a series of guideways (11) arranged side by side, each being pivotally mounted (at 12), by means (14–18) for setting a lateral distance between the guideways (11).

9. An apparatus according to claim 8, characterized in that the means (14–18) for setting the lateral distance between the guideways (11) comprise a pivotable lever (16) at a free end of which a curved support section (15) is located against a backwall of each guideway (11), and the support section (15) has a series of slots (14), each capable of receiving a pin (18) mounted on the backwall of the guideway (11).

* * * * *